(12) United States Patent
Jackson

(10) Patent No.: US 10,744,841 B2
(45) Date of Patent: Aug. 18, 2020

(54) HYDRAULIC ANTI-SWAY BAR DISCONNECT SYSTEM

(71) Applicant: Wayne Peter Jackson, Brisbane (AU)

(72) Inventor: Wayne Peter Jackson, Brisbane (AU)

(73) Assignee: Wayne Peter Jackson, Brisbane (AU)

( * ) Notice: Subject to any disclaimer, the term of this patent is extended or adjusted under 35 U.S.C. 154(b) by 62 days.

(21) Appl. No.: 15/344,953

(22) Filed: Nov. 7, 2016

(65) Prior Publication Data
US 2017/0129302 A1    May 11, 2017

(30) Foreign Application Priority Data

Nov. 6, 2015   (AU) ................................ 2015904567

(51) Int. Cl.
*B60G 21/055*    (2006.01)

(52) U.S. Cl.
CPC ...... *B60G 21/0556* (2013.01); *B60G 2202/32* (2013.01); *B60G 2202/413* (2013.01); *B60G 2202/414* (2013.01); *B60G 2204/1224* (2013.01); *B60G 2204/62* (2013.01); *B60G 2206/111* (2013.01); *B60G 2300/124* (2013.01); *B60Y 2200/20* (2013.01); *B60Y 2400/303* (2013.01)

(58) Field of Classification Search
CPC ....................... B60G 21/0556; B60G 2202/413
See application file for complete search history.

(56) References Cited

U.S. PATENT DOCUMENTS

| 5,217,245 | A  | * | 6/1993  | Guy    | B60G 21/0556 280/124.152 |
| 5,630,623 | A  | * | 5/1997  | Ganzel | B60G 17/016 280/124.106 |
| 5,662,356 | A  | * | 9/1997  | Lund   | B60G 17/0162 267/187 |
| 5,875,953 | A  | * | 3/1999  | Shioya | B23P 19/027 228/112.1 |
| 7,722,055 | B2 | * | 5/2010  | Hall   | B60G 17/0162 280/5.502 |
| 2003/0125859 | A1 | * | 7/2003 | Dix | B60G 3/14 701/50 |
| 2008/0269987 | A1 | * | 10/2008 | Barron | B60G 17/0162 701/38 |

* cited by examiner

*Primary Examiner* — James A English
(74) *Attorney, Agent, or Firm* — Shumaker, Loop & Kendrick, LLP

(57) ABSTRACT

A hydraulic anti-sway bar disconnect system for locking and unlocking movement of an anti-sway bar of a vehicle, the system including an actuable control valve for controlling the movement of a working fluid within the system, at least one cylinder and piston assembly connected to the anti-sway bar having a working fluid connection port at both ends of the cylinder, a working fluid reservoir in fluid connection with the working fluid connection ports on the at least one cylinder via the actuable control valve whereby the actuable control valve is operable to maintain the system in a locked condition whereby working fluid in the cylinder maintains the piston substantially in position and an unlocked condition in which the actuable control valve allows the working fluid in the cylinder to exit the cylinder giving the piston free travel in the cylinder.

13 Claims, 4 Drawing Sheets

HYDRAULIC ANTI-SWAY BAR DISCONNECT SYSTEM

This application claims the benefit of priority of Australian Patent Application No. 2015904567, filed Nov. 6, 2015.

TECHNICAL FIELD

The present invention relates to a hydraulic anti-sway bar disconnect system for use in vehicle, particularly a quad bike or other off road vehicle.

BACKGROUND ART

An anti-sway or anti-roll bar is intended to force each side of the vehicle to lower, or rise, to similar heights, to reduce the sideways tilting (roll) of the vehicle on curves, sharp corners, or large bumps.

Although there are many variations in design, a common function is to force the opposite wheel's shock absorber, spring or suspension rod to lower, or rise, to a similar level as the other wheel. In a fast turn, a vehicle tends to drop closer onto the outer wheels, and the anti-sway bar soon forces the opposite wheel to also get closer to the vehicle. As a result, the vehicle tends to "hug" the road closer in a fast turn, where all wheels are closer to the body. After the fast turn, then the downward pressure is reduced, and the paired wheels can return to their normal height against the vehicle, kept at similar levels by the connecting anti-sway bar.

A negative side-effect of connecting pairs of wheels is that a jarring or bump to one wheel tends to also jar the opposite wheel, causing a larger impact applied across the whole width of the vehicle. A vehicle that runs over several potholes scattered in the road tends to rock side-to-side, or waddle, due to the action of the bar at each pair of wheels. Other suspension techniques can delay or dampen this effect of the connecting bar, as when hitting small holes that momentarily jolt a single wheel, whereas larger holes or longer tilting then tugs the bar with the opposite wheel.

A conventional anti-sway bar is usually a torsion spring that resists body roll motions. It is usually constructed out of a cylindrical steel bar, formed into a "U" shape that connects to the body at two points, and at the left and right sides of the suspension. If the left and right wheels move together, the bar rotates about its mounting points. If the wheels move relative to each other, the bar is subjected to torsion and forced to twist. Each end of the bar is connected to an end link through a flexible joint. The anti-sway bar end link connects in turn to a spot near a wheel or axle, transferring forces from a heavily-loaded axle to the opposite side.

The bar resists the torsion through its stiffness. The stiffness of an anti-roll bar is proportional to the stiffness of the material, the fourth power of its radius, and the inverse of the length of the lever arms (i.e., the shorter the lever arm, the stiffer the bar). Stiffness is also related to the geometry of the mounting points and the rigidity of the bar's mounting points. The stiffer the bar, the more force required to move the left and right wheels relative to each other. This increases the amount of force required to make the body roll.

Excessive roll stiffness, typically achieved by configuring an anti-roll bar too aggressively, can make the inside wheels lift off the ground during hard cornering. This can be used to advantage: many front wheel drive production cars lift a rear wheel when cornering hard in order to overload the opposite wheel, limiting understeer.

There are active anti-sway systems that are controlled by a controller provided linked to the suspension ECU or body sensors and electric motors. There are even systems that can be used to disengage the stabilizer bars when off-road, allowing for greater vehicle articulation and ride quality. Most prior art system include an elaborate array of linkages, cables and levers or complex components that are prone to the elements and to damage by rocks, mud, sand, being hit by sticks and so on.

It will be clearly understood that, if a prior art publication is referred to herein, this reference does not constitute an admission that the publication forms part of the common general knowledge in the art in Australia or in any other country.

SUMMARY OF INVENTION

The present invention is directed to a hydraulic anti-sway bar disconnect system, which may at least partially overcome at least one of the abovementioned disadvantages or provide the consumer with a useful or commercial choice.

With the foregoing in view, the present invention in one form, resides broadly in an anti-sway bar disconnect system for locking and unlocking movement of an anti-sway bar of a vehicle, the system including
 a. an actuable control valve for controlling the movement of a working fluid within the system,
 b. at least one cylinder and piston assembly connected to the anti-sway bar having a working fluid connection port at both ends of the cylinder,
 c. a working fluid reservoir in fluid connection with the working fluid connection ports on the at least one cylinder via the actuable control valve whereby the actuable control valve is operable to maintain the system in a locked condition whereby working fluid in the cylinder maintains the piston substantially in position and an unlocked condition in which the actuable control valve allows the working fluid in the cylinder to exit the cylinder giving the piston free travel in the cylinder.

The control valve of the preferred embodiment is preferably controlled by a manually actuable switch or similar provided relative to the driver of the vehicle such that the driver can remotely lock and unlock the anti-sway bar as desired.

The control valve of the system of the present invention is also preferably connected to the vehicle power source in order to power the control valve as required.

The system of the present invention is typically provided for off-road vehicles or rough terrain vehicles. The system of the present invention can be used on the front and/or rear anti-sway bars of a vehicle. Where more than one cylinder and piston assembly are provided, the assemblies may be separately actuable or actuable together depending upon the user preference and/or situation.

Although the manually actuable switch is a particularly preferred embodiment, the system of the present invention may be actuated or switched between the locked and unlocked conditions in other situations or using other mechanisms. For example, the system may be unlocked when the transmission of the vehicle is placed in low range (by the user) and then locked when the transmission is placed into high range. Still further, a speed sensor may be used to move the system between the locked and unlocked conditions or vice versa. A speed sensor may for example prevent unlocking of the system above certain speeds and/or the system may automatically move to the locked condition at a threshold speed for example, approximately 20 km/h.

The system of the present invention will typically include a working fluid but the system can be either pneumatic or preferably hydraulic. It is preferred that the working fluid system is substantially sealed except for a fluid breather port provided in the preferred hydraulic version, normally in association with the fluid reservoir.

The system of the present invention includes an actuable control valve. Preferably, the control valve is electrically powered and therefore, it can simply utilise the power source of the vehicle. Any type of control valve can be used. Generally however the control valve will be relatively small as the volume of the cylinder will typically be quite small and it will also allow the control valve to be mounted relative to the vehicle more easily.

The control valve will preferably include at least one port to connect to the fluid reservoir. The fluid may be pumped or gravity fed from the reservoir to the control valve. The movement of the piston within the cylinder when in the unlocked condition may act to pump fluid. The control valve will also preferably include a pair of ports, one connected to each of the ports on the cylinder, typically using connection hoses or lines. More ports may be provided if more than one cylinder assembly is provided or alternatively, only two ports may be provided and other forms of connection may be used to connect more than one cylinder to the respective ports of the control valve.

A solenoid is typically provided to control the opening and closing of each of the ports provided on the control valve. Preferably, the solenoid is electrically powered and can be powered from the vehicle power source. Typically, the solenoids are controlled, normally manually, by the user/driver and/or by other mechanisms as outlined above.

The system of the present invention also includes at least one cylinder and piston assembly connected to the anti-sway bar and a fluid connection port at both ends of the cylinder. Generally, the system is provided such that one fixed arm is provided on one end of the anti-sway bar and one cylinder and piston assembly is provided on the other end of the anti-sway bar.

As mentioned, the cylinder and piston assembly will preferably include a cylinder and a piston which is reciprocally movable within the cylinder with the piston is mounted relative to an elongate rod. An attachment point is preferably provided on the elongate rod and a second attachment point is preferably provided on or relative to the cylinder in order to mount the cylinder and piston assembly to the anti-sway bar and a transverse arm mounting the wheel of the vehicle.

The cylinder will preferably include an elongate body, which is preferably tubular. The cylinder will normally have open ends and a pair of end caps is preferably provided, one at either end of the cylinder. The end caps are preferably threaded to allow the end caps to be removed from the cylinder such as for maintenance and the like. One of the end caps, normally at the end of the cylinder positioned lower in use, will preferably have an opening therethrough to allow the rod associated with the piston to move relative to the cylinder and in order to change the overall length of the cylinder and piston assembly.

A fluid connection port is preferably provided in each of the end caps. Normally, a fluid connection hose or conduit will be provided between the fluid connection port of the end caps and the fluid connection port of the control valve.

Typically, the cylinder and piston assembly is length-matched to the fixed arm such that the piston is located approximately part way along the cylinder when the cylinder and piston assembly is in the locked condition with working fluid located on both sides of the piston in order to hold the piston in position.

In use, when the cylinder and piston assembly is in the locked condition, the working fluid, preferably a non-compressible fluid is located to either side of the piston within the cylinder which will effectively substantially prevent movement of the piston within the cylinder which locks the length of the cylinder and piston assembly. In the unlocked condition, the fluid will typically be removed from the cylinder which allows the piston to freely move within the cylinder.

The system of the present invention includes a working fluid reservoir. Normally, the fluid reservoir will be used for a hydraulic fluid of which there are many types commercially available. The fluid reservoir is normally sufficiently large to hold not only the volume of fluid used in any one or more cylinders in the system in the locked condition, but also some excess fluid.

The fluid reservoir can be provided in any physical location relative to the other components but access to the fluid reservoir by the working fluid in the system is through the control valve. Normally, the working fluid reservoir will be mounted to or relative to a chassis of the vehicle. As mentioned above, the fluid reservoir is preferably connected to the control valve via one or more hoses or hydraulic lines.

The fluid reservoir can have any suitable shape, and can be made from any suitable material.

According to a particularly preferred embodiment, a breather is provided on the fluid reservoir to allow fluid flowing from the cylinder to the reservoir to displace any air the reservoir and to allow air to be drawn into the reservoir when the fluid is driven back to the cylinder when it assumes the locked condition. The breather will also preferably prevent or minimise detritus from entering the fluid reservoir through the breather and also any insect life or undesirable material.

As mentioned above, in the locked condition, the control valve will be actuated so that fluid is provided to the cylinder to fix the piston within the cylinder substantially in position relative to the cylinder to effectively substantially fix the overall effective length of the cylinder and piston assembly. In the locked condition, the cylinder and piston assembly will effectively act as a solid link.

When actuated, the control valve will allow fluid to be removed from the cylinder which allows the piston free travel within the cylinder whether displacing hydraulic fluid to or from the reservoir or not. This will unlock the cylinder and piston assembly allowing the one of the wheels relative to which the anti-sway bar is connected to move independently of the other as well as providing an increased wheel travel.

A user can therefore lock and unlock the anti-sway bar as they require or desire to fit different circumstances.

Use of some fluids may require the use of a pump in order to move the fluid around the components of the system. Therefore, the system of the present invention may include a pump in order to ensure that the working fluid that has exited the cylinder in the unlocking process, can be returned to the cylinder as required and may indeed move the fluid about the system as required. The pump may be used for a pneumatic system but is typically not required for a hydraulic system.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

According to a particularly preferred embodiment of the present invention, a hydraulic anti-sway bar disconnect system 10 is provided.

Figure 4:
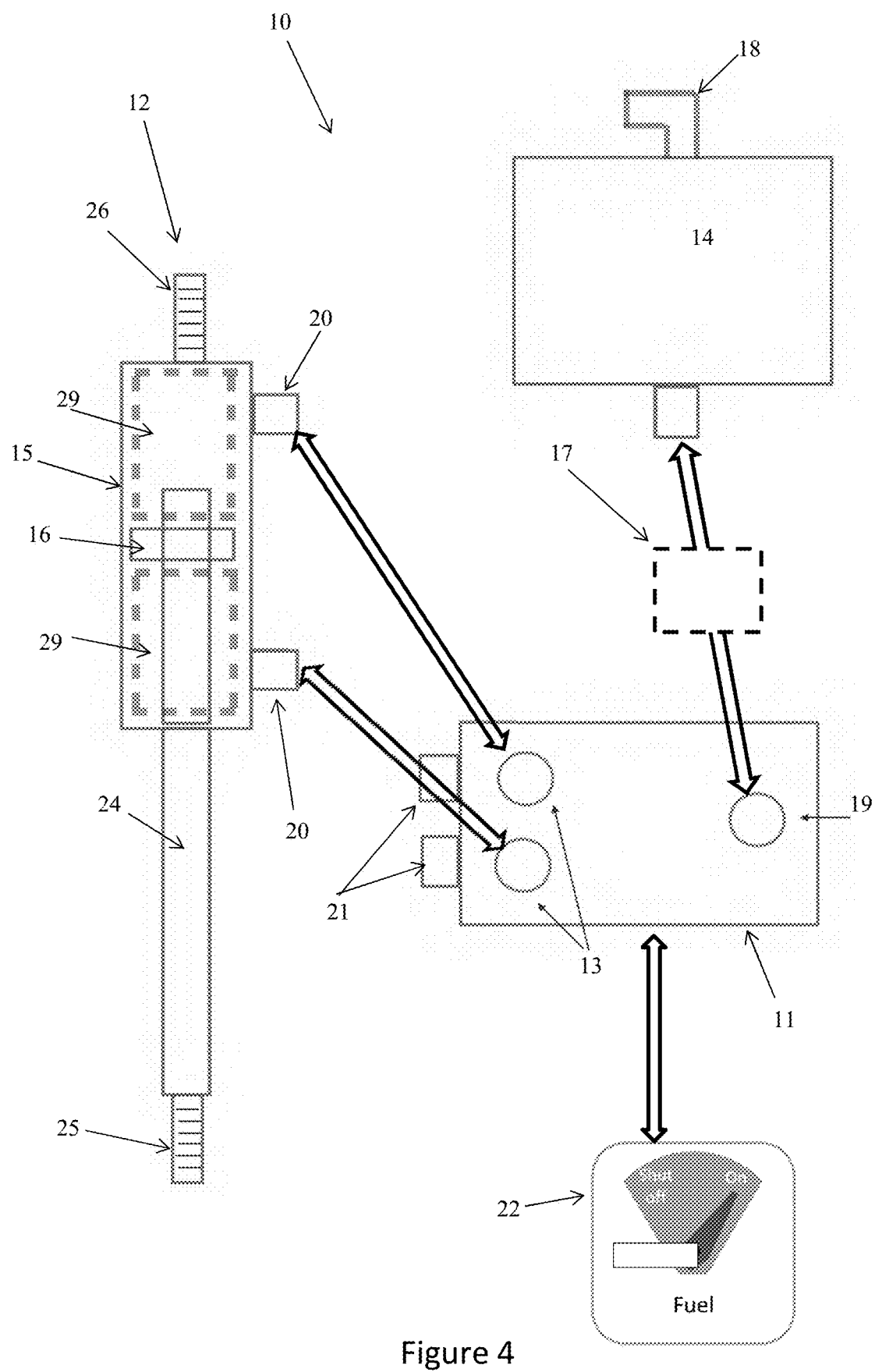
FIG. 4 is a schematic view of the system of the present invention according to a preferred embodiment.

The anti-sway bar disconnect system 10 illustrated schematically in FIG. 4 includes an actuable control valve 11 for controlling the movement of a working fluid within the system, at least one cylinder and piston assembly 12 connected to the anti-sway bar having a working fluid connection port 13 at both ends of the cylinder, a working fluid reservoir 14 in fluid connection with the working fluid connection ports 13 on the at least one cylinder via the actuable control valve 11 whereby the actuable control valve 11 is operable to maintain the system in a locked condition whereby working fluid in the cylinder 15 maintains the piston 16 substantially in position and an unlocked condition in which the actuable control valve 11 allows the working fluid in the cylinder 15 to exit the cylinder 15 giving the piston 16 free travel in the cylinder 15.

The control valve 11 of the preferred embodiment is preferably controlled by a manually actuable switch 22 provided relative to the driver of the vehicle such that the driver can remotely lock and unlock the anti-sway bar as desired.

The control valve 11 of the system of the present invention is also preferably connected to the vehicle power source in order to power the control valve as required.

It is preferred that the working fluid system is substantially sealed except for a fluid breather port 18 provided in association with the fluid reservoir 14.

The control valve 11 of the preferred embodiment electrically powered and therefore, they can simply utilise the power source of the vehicle. Any type of control valve can be used. Generally however both will be relatively small as the volume of the cylinder 15 will typically be quite small and it will also allow the control valve 11 to be mounted relative to the vehicle more easily.

The control valve 11 includes port 19 to connect to the fluid reservoir 14. The fluid may be pumped or gravity fed from the reservoir 14 to the control valve 11.

As illustrated in FIG. 4, the control valve 11 includes a pair of ports 13, one connected to each of the ports 20 on the cylinder 15, typically using connection hoses or lines.

A solenoid 21 is provided for each port 13 to control the opening and closing of each of the ports 13 provided on the control valve 11. In the preferred embodiment, the solenoid 21 is electrically powered and can be powered from the vehicle power source. Typically, the solenoids 21 are controlled by the user/driver utilising the switch 22.

Figure 1:
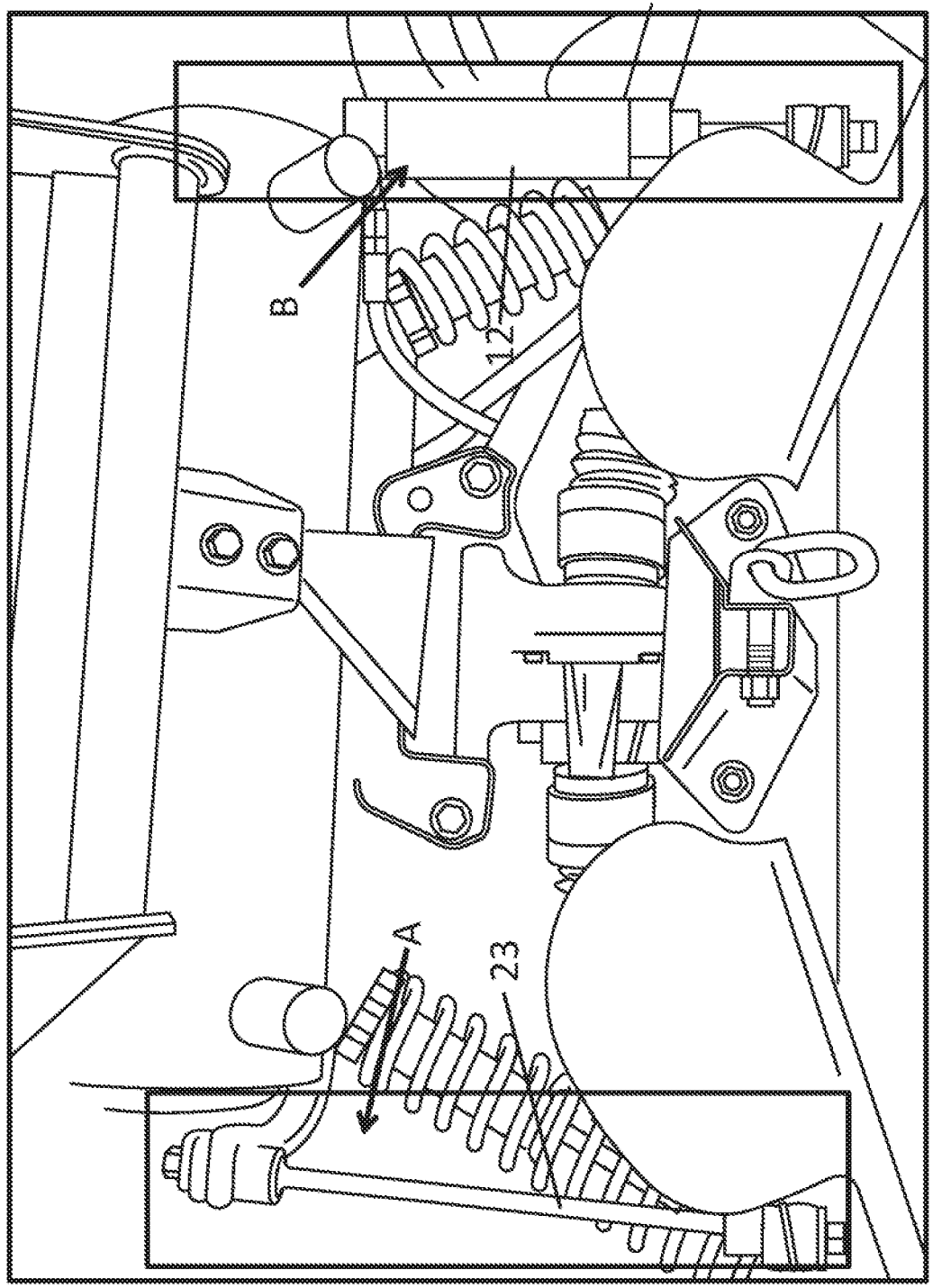
FIG. 1 is a view from the rear of a quad-bike with a system according to a preferred embodiment of the present invention installed thereon.
Figure 2:
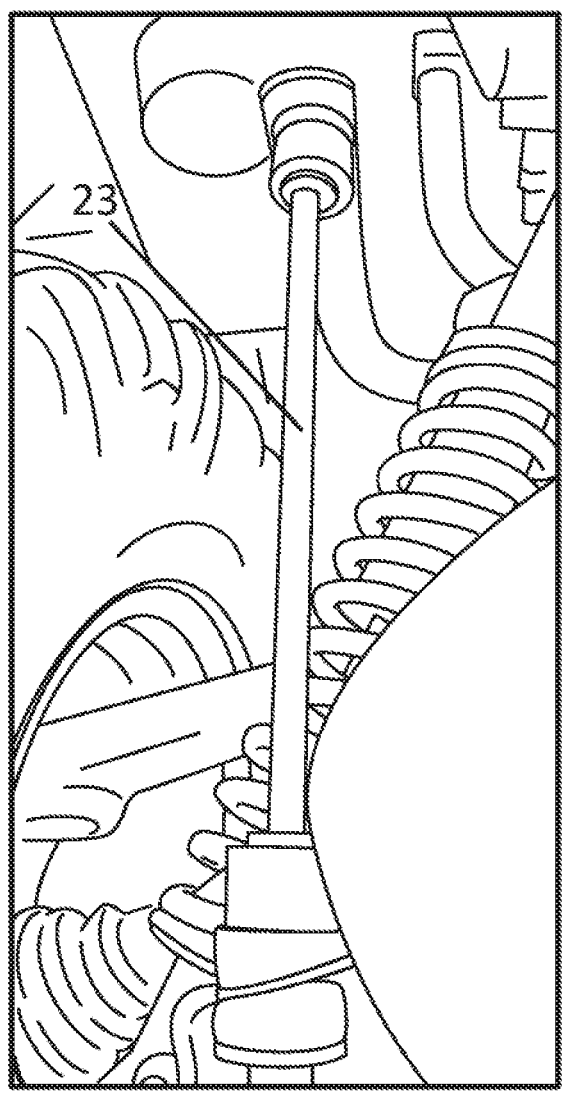
FIG. 2 is a detail view of the portion identified as "A" in FIG. 1.
Figure 3:
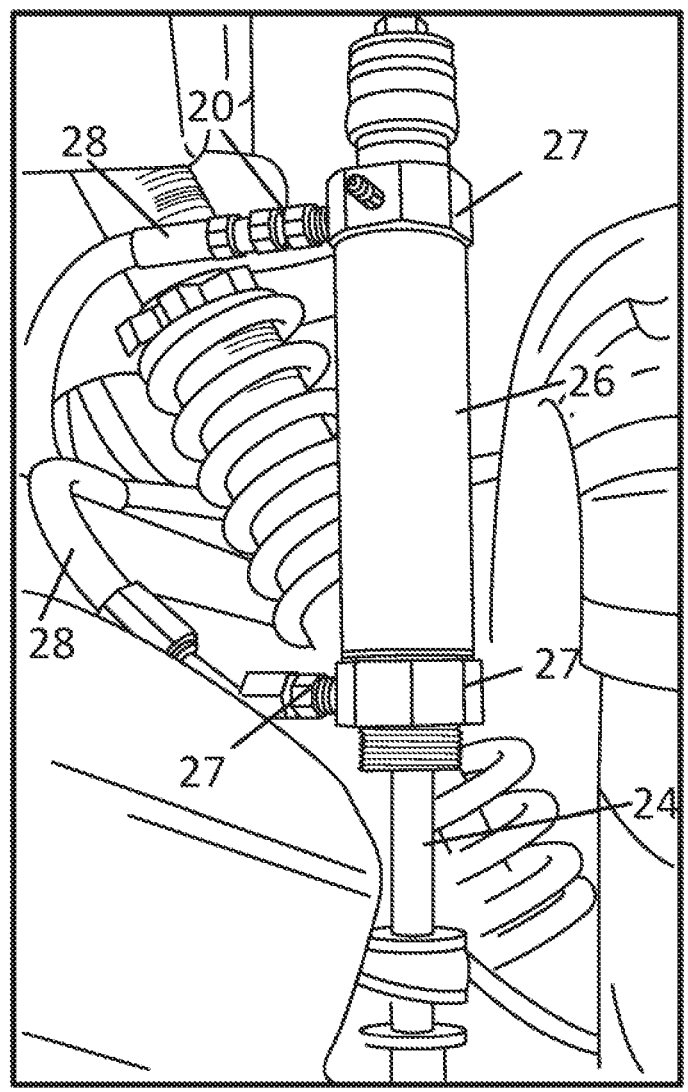
FIG. 3 is a detail view of the portion identified as "B" in FIG. 1.

As illustrated in FIGS. 1 to 3, the system of the preferred embodiment is provided such that one fixed arm 23 is provided on one end of the anti-sway bar of the vehicle and one cylinder and piston assembly 12 is provided on the other end of the anti-sway bar.

Each cylinder and piston assembly 12 includes a cylinder 15 and a piston 16 which is reciprocally movable within the cylinder 15 with the piston 16 mounted relative to an elongate rod 24. An attachment point 25 is preferably provided on the elongate rod 24 and a second attachment point 26 is preferably provided on or relative to the cylinder 15 in order to mount the cylinder and piston assembly 12 to the anti-sway bar and a transverse arm mounting the wheel of the vehicle as illustrated in FIGS. 1 and 3 in particular.

The cylinder 15 includes an elongate tubular body 26 with open ends and a pair of end caps 27 are provided, one at either end of the cylinder 15 as shown in FIG. 3 in particular. The end caps 27 are threaded to allow the end caps 27 to be removed from the cylinder 15 such as for maintenance and the like. The lower end cap has an opening therethrough to allow the rod 24 associated with the piston 16 to move relative to the cylinder 15 and in order to change the overall length of the cylinder and piston assembly 12.

A fluid connection port 20 is provided in each of the end caps 27. Normally, a fluid connection hose or conduit 28 is provided between the fluid connection port 20 of the end caps 27 and the fluid connection port 13 of the control valve 11.

Typically, the cylinder and piston assembly 12 is length-matched to the fixed arm 13 such that the piston 16 is located approximately part way along the cylinder 15 when the cylinder and piston assembly 12 is in the locked condition with working fluid 29 located on both sides of the piston 16 in order to hold the piston 16 in position.

In use, when the cylinder and piston assembly is in the locked condition such as is illustrated in FIG. 4, the non-compressible working fluid is located to either side of the piston 16 within the cylinder 15 which will effectively substantially prevent movement of the piston 16 within the cylinder 15 which locks the length of the cylinder and piston assembly 12. In the unlocked condition, the fluid will typically be removed from the cylinder which allows the piston to freely move within the cylinder.

Normally, the fluid reservoir 14 will be used for a hydraulic fluid of which there are many types commercially available. The fluid reservoir 14 is normally sufficiently large to hold not only the volume of fluid used in any one or more cylinders in the system in the locked condition, but also some excess fluid.

The fluid reservoir 14 can be provided in any physical location relative to the other components but access to the fluid reservoir by the working fluid in the system is through the control valve. Normally, the working fluid reservoir will be mounted to or relative to a chassis of the vehicle. As mentioned above, the fluid reservoir is preferably connected to the control valve via one or more hoses or hydraulic lines.

The breather 18 provided on the fluid reservoir 14 allows fluid flowing from the cylinder 15 to the reservoir 14 to displace air from the reservoir 14 and to allow air to be drawn into the reservoir 14 when the fluid is driven back to the cylinder 15 when it assumes the locked condition. The breather 18 will also preferably prevent or minimise detritus from entering the fluid reservoir through the breather and also any insect life or undesirable material.

According to the preferred embodiment, the hydraulic fluid reservoir 14 is positioned approximately 250 mm above the hydraulic cylinder 12 and approximately 150 mm above the control valve 11. The hydraulic circuit is completely filled with hydraulic fluid and the air is bled out of the system. The hydraulic cylinder 12 is normally fitted with bleeder nipples for this purpose.

When the sway bar disconnect is in locked position, the hydraulic fluid is on both sides of the piston 16 in hydraulic cylinder 15. The piston 16 has special seals to stop the hydraulic fluid from leaking past the piston in the cylinder 15. The control valve 11 is in a locked position, so no hydraulic fluid can move in any direction. In effect the cylinder 12 is locked (as the hydraulic fluid cannot be compressed). This makes the cylinder 12 function as a solid rod.

When the switch 22 is flicked to sway bar disconnect, 12 Volt solenoids in the control valve 11 are opened. This allows hydraulic fluid free movement between the hydraulic cylinder 12 (through the control valve 11) and the reservoir 14. If the shaft 24 moves in a more compressed direction, the fluid on one side of the piston 16 is pushed back through the hydraulic hoses 28 via the control valve 11 to reservoir 14. The hydraulic fluid on the other side of the piston 16 can flow to fill the hydraulic cylinder 15 by gravity as the fluid reservoir 14 and control valve 11 are above the hydraulic cylinder 12. Fluid movement is also assisted by the suction of the piston 16 moving in the hydraulic cylinder 15. So the piston 16 effectively acts as a hydraulic pump. As the piston 16 moves in the cylinder 15, fluid is pushed and sucked. In suction phase, the fluid is assisted by gravity.

The hydraulic fluid preferred for this application is a hydraulic oil of 10 W viscosity which is very light and thin and quick to move around in a hydraulic system. As the sway bar disconnect is preferably used at very low speeds in very uneven terrain, the piston 16 and shaft (which are connected to the vehicle suspension arm) move slowly in the cylinder 15. This slow movement means that the hydraulic oil movement created by the piston 16 and suction is adequate.

As mentioned above, in the locked condition, the control valve will be actuated so that fluid is provided to the cylinder to fix the piston within the cylinder substantially in position relative to the cylinder to effectively substantially fix the overall effective length of the cylinder and piston assembly. In the locked condition, the cylinder and piston assembly will effectively act as a solid link.

When actuated, the control valve will allow fluid to be removed from the cylinder which allows the piston free travel within the cylinder whether displacing hydraulic fluid to or from the reservoir or not. This will unlock the cylinder and piston assembly allowing the one of the wheels relative to which the anti-sway bar is connected to move independently of the other as well as providing an increased wheel travel.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

What is claimed is:

1. A hydraulic anti-sway bar disconnect system for locking and unlocking movement of an anti-sway bar of a vehicle, the system including an actuable control valve for controlling the movement of a working fluid within the system, at least one cylinder and piston assembly connected to the anti-sway bar having a working fluid connection port at both ends of a cylinder, a working fluid reservoir in fluid connection with the working fluid connection ports on the cylinder via the actuable control valve whereby the actuable control valve is operable to maintain the system in a locked condition whereby working fluid in the cylinder maintains a piston substantially in position and an unlocked condition in which the actuable control valve allows the working fluid in the cylinder to exit the cylinder giving the piston free travel in the cylinder, and wherein the actuable control valve is controlled by a manually actuable switch provided relative to the driver of the vehicle such that the driver can remotely lock and unlock the anti-sway bar as desired, or wherein the system is actuated or switched between the locked and unlocked conditions according to changes in transmission of the vehicle between low range and high range, wherein the cylinder includes an elongate body with open ends and only a pair of end caps in which each end cap of the pair of end caps is spaced apart from one another and is removably, threadedly engaged at each end of the elongate body on an outer diameter of thereof and each includes a fluid connection port formed thereon with a fluid connection hose or conduit provided between the fluid connection port of the end caps and a respective fluid connection port of the control valve, and the hydraulic anti-sway bar disconnect system further includes a pump in order to move the fluid around components of the system.

2. The hydraulic anti-sway bar disconnect system as claimed in claim 1 wherein where more than one cylinder and piston assembly is provided, each cylinder and piston assembly is separately actuable.

3. The hydraulic anti-sway bar disconnect system as claimed in claim 1 wherein where more than one cylinder and piston assembly is provided, each cylinder and piston assembly is actuable together depending upon the user preference and/or situation.

4. The hydraulic anti-sway bar disconnect system as claimed in claim 1 further including a speed sensor used to move the system between the locked and unlocked conditions or vice versa.

5. The hydraulic anti-sway bar disconnect system as claimed in claim 1 wherein the working fluid is a hydraulic working fluid.

6. The hydraulic anti-sway bar disconnect system as claimed in claim 1 wherein the actuable control valve includes at least one port to connect to the fluid reservoir and a pair of ports, one connected to each of the ports on the cylinder.

7. The hydraulic anti-sway bar disconnect system as claimed in claim 6 wherein at least one solenoid is provided to control opening and closing of each of the ports provided on the control valve.

8. The hydraulic anti-sway bar disconnect system as claimed in claim 7 wherein the at least one solenoid is actuated manually by the user/driver.

9. The hydraulic anti-sway bar disconnect system as claimed in claim 1 wherein a fixed suspension arm of the vehicle is provided on one end of the anti-sway bar and the cylinder and piston assembly is provided on an opposed end of the anti-sway bar.

10. The hydraulic anti-sway bar disconnect system as claimed in claim 1 wherein each cylinder and piston assembly includes a cylinder and a piston which is reciprocally movable within the cylinder with the piston is mounted relative to an elongate rod with a first attachment point is provided on the elongate rod and a second attachment point is provided on or relative to the cylinder in order to mount the cylinder and piston assembly to the anti-sway bar and a transverse arm mounting a wheel of the vehicle.

11. The hydraulic anti-sway bar disconnect system as claimed in claim 1 wherein the cylinder and piston assembly is length-matched to a fixed arm of a vehicle suspension such that the piston is located approximately part way along the cylinder when the cylinder and piston assembly is in the locked condition with working fluid located on both sides of the piston in order to hold the piston in position.

12. The hydraulic anti-sway bar disconnect system as claimed in claim 8 wherein a breather is provided on the fluid reservoir to allow fluid flowing from the cylinder to the reservoir to displace any air the reservoir and to allow air to be drawn into the reservoir when the fluid is driven back to the cylinder when it assumes the locked condition.

13. The hydraulic anti-sway bar disconnect system as claimed in claim 1 wherein when actuated from, the locked to the unlocked condition, the actuable control valve allows fluid to be removed from the cylinder which allows the piston free travel within the cylinder whether displacing hydraulic fluid to or from the reservoir or not.

* * * * *